Patented May 4, 1948

2,440,874

UNITED STATES PATENT OFFICE 2,440,874

COMPOUNDS OF THE ADRENAL CORTICAL HORMONE SERIES AND PROCESS OF MAKING SAME

Tadeus Reichstein, Basel, Switzerland

No Drawing. Application July 27, 1943, Serial No. 496,350. In Switzerland October 7, 1942

17 Claims. (Cl. 260—397.4)

It is known that one or two acetoxy groups can be introduced in the α-position to a keto group by the action of lead tetra-acetate in a solution of glacial acetic acid (Dimroth and Schweitzer, Berichte der Deutschen Chemischen Gesellschaft, vol. 56, page 1375 [1925]). In this way it has been possible, for example, to convert acetone into acetoxy-acetone and symmetrical diacetoxy-acetone.

The first application of this method to ketones of the cyclopentano-polyhydrophenanthrene series is described in U. S. Patents No. 2,230,772 and No. 2,230,773. In British Patent No. 524,006 lead tetra-acylates with the exclusion of lead tetra-acetate are used. In the said patents, progesterone is said to give a good yield of 21-acyloxy-progesterones (desoxycorticosterone-acylates) by the described reaction, a fact which has been disputed, however, by Reichstein and Montigel (Helvetica Chimica Acta, vol. 22, page 1212 [1939]). The unfavourable course of the reaction was subsequently admitted by the inventors Erhardt, Ruschig and Aumüller (Berichte der Deutschen Chemischen Gesellschaft, vol. 72, page 2035 [1939]).

On applying the lead tetra-acylate method to $\Delta^{5,6}$-pregnene-20-one-3-ol-acylate, ketol-acylates, namely $\Delta^{5,6}$ - 3,21 - diacyloxy-pregnene-20-ones, are obtained in good yields. The latter are, however, biologically inactive and cannot be easily converted into the corresponding active 3-keto compounds, the desoxycorticosterone acylates.

It has now been found that compounds of the adrenal cortical hormone series can be obtained by treating compounds of the cyclopentano-polyhydrophenanthrene series which contain at least in the 3-position a free nuclear hydroxyl group, in the 17-position an acyl group with at least one hydrogen atom in α-position to the keto group, and at the carbon atom 11 an oxo or a hydroxy group, a group convertible into a hydroxyl group by hydrolysis or a nuclear double bond (being therefore in 11,12- or 9,11-position), with lead tetra-acylates or aryl-iodoso-acylates, converting the nuclear hydroxyl group in the 3-position in a known manner into a keto group (if necessary after temporary protection of carbon double bonds which may be present), introducing, if desired, a double bond into the α-position to this keto group and finally treating with hydrolizing and/or esterifying agents.

The parent compounds for the present process may be saturated, or unsaturated at one or more places, and of any steric configuration. They may contain, in addition to the above mentioned substituents, free esterified or etherized hydroxyl groups and keto groups, for example in the 6,7 and/or 12, and also in the 17-position. Of the compounds unsaturated in ring C, those with a double bond in the 11,12-position, particularly, and also in the 9,11 position can be used. The acyl, e. g. acetyl or propionyl, group at the 17 carbon atom may have in addition to the necessary hydrogen atom at the α-position to the keto group, for example, substituents such as acyl, or free or esterfied carboxyl radicals. Such starting compounds can be prepared, for example, by malonic-ester synthesis.

According to the present process the parent material is first treated with lead tetra-acylates such as lead tetra-acetate, tetra-propionate, tetra-butyrate, tetra-palmitate or tetra-benzoate. This reaction is best carried out in solvents or diluents, preferably in the carboxylic acid which corresponds to the acid radical of the lead tetra-acylate used, namely in acetic, propionic, butyric or palmitic acid, etc., if necessary after the addition of inert solvents such as benzene. Surprisingly, it has been found that particularly good yields are obtained if the acetic acid used is mixed with some percents of water and if the reaction is carried out at a temperature of about 60° C. Instead of lead tetra-acylates, aryl-iodoso-acylates, e. g. phenyl-iodoso-acetate can be used.

Free nuclear hydroxyl groups contained in the parent compounds, particularly that in the 3-position take, surprisingly enough, practically no part in the reaction and the presence of double bonds in unsaturated compounds does not lead to complications. In contrast to the process starting from compounds with a $\Delta^4$-3-keto group, the first stage of the present process gives a very good yield. The advantage over the process which starts from 3-acylates consists of the fact that the ketol-esters obtained by the new process can easily be converted into the corresponding highly active 3-ketones. The products are in addition substituted in the 11-position or possess a double bond starting from the 11-carbon atom and are therefore, as is known, particularly active in certain test methods.

On working up further, the free 3-hydroxyl group is converted into a keto group by the action of the usual oxidizing or dehydrogenating agents e. g. chromic acid in glacial acetic acid or permanganate, by heating with metals or metal oxides or by means of metal alcoholates of phenolates in the presence of carbonyl compounds (acetone, cyclohexanone etc.) or by decomposition by heat or triarylmethyl ethers. Carbon double bonds present may be temporarily protected, if necessary, by addition and subsequent elimination of halogen or hydrohalide. Simultaneously with the oxidation or dehydrogenation of the 3-hydroxyl group, any further free hydroxyl groups can be converted into keto groups or the hydroxyl groups can be only partially converted, e. g., by allowing only the calculated quantity of oxidizing agent to react or, in particular, by using metal alcoholates or phenolates in the presence of carbonyl compounds. If no double bond is present in the α-position to the 3-keto group, it can be introduced in a known way e. g. by halogenisation and subsequent elimination of hydrohalide.

On the products obtained, hydrolizing agents may be allowed to act, for example to saponify ester groups. Thereby the relative sensitivity of these groups to alkalis must be taken into consideration so that it is advisable to work with acids or very weak alkalis, such as bicarbonates. The action of alkaline reagents may, for example, also serve to split β-diketone groups present in the side chain.

Compounds obtained which have free hydroxyl groups and, in particular, a free ketol group can be esterfied in a known way. Radicals of organic or inorganic acids can be introduced e. g. of carboxylic acids such as acetic, propionic, butyric, crotonic, palmitic, benzoic or phenyl-acetic acid, of polycarboxylic acids such as phthalic or succinic acid, of sulphonic acids such as methane- or toluene-sulphonic acid, of carbonic acid or its derivatives, of sulphuric acids, hydrohalic acids, phosphoric acids or boric acid.

Free or liberated carboxylic acids can finally be decarboxylated at any stage in the process, particularly by heating.

The products of the present process such as, for example, the Δ⁴-pregnene-3,11,20-trione-21-ols, Δ⁴,⁹-pregnadiene-3,20-dione-21-ols, Δ⁴,¹¹-pregnadiene-3,20-dione-21-ols, Δ⁴-pregnene-3,20-dione-11,21-diols or their esters are therapeutically valuable compounds with the action of adrenal cortical hormones, or can be converted into such.

The following examples illustrate the invention but are not to be regarded as limiting it in any way, the parts being by weight:

*Example 1*

The following method of preparation of the parent compound may be used: pregnane-3,11,20-trione, melting point 154–156° C., (obtainable, for example, as described in patent application Serial No. 474,726, filed February 4, 1943, now Patent No. 2,403,683, dated July 9, 1946) is hydrogenated in glacial acetic acid either with palladium or a little platinum, until one mol of hydrogen has been absorbed. The product of the hydrogenation is precipitated in the usual way with about 3 parts of digitonin in methanol of 80 percent strength and the precipitate split up by dissolving in pyridine and precipitating with ether. This crude product can be used directly. It can also first be separated by means of the chloride of trimethylammonium-acetic acid-hydrazide, the resulting crystalline ketone fraction being then used. By crystallisation or chromatographic purification, the pregnane-3β-ol-11,20-dione can be obtained in analytically pure form. It crystallizes from a mixture of acetone and ether in colourless needles which melt at 152° C. For purification also the monoacetate is suitable; it crystallizes from a mixture of acetone and ether in colourless hexagonal prisms which melt at 169° C. Specific rotation of the acetate $[\alpha]_d =$ +89° (in acetone). On saponification, the pure hydroxy-diketone is obtained.

5 parts of the pregnane-3β-ol-11,20-dione, melting point 152° C., are dried by dissolving in hot toluene and evaporating the solution down in vacuo, and then heated to 60° C. with 200 parts of very pure acetic acid containing 2 percent of water and 12 parts of lead tetra-acetate for 24 hours, with the exclusion of moisture. The whole is then evaporated down in vacuo and water added to the residue, lead dioxide separating out. The suspension is thoroughly extracted several times with ether, and the extracts are washed with water, sodium carbonate solution and then again with water, dried with sodium sulphate and evaporated down. This neutral crude product is dissolved in absolute benzene and purified, after the addition of pentane, by chromatography over a column of aluminium oxide. Pregnane-3β,21-diol-11,20-dione-21-monoacetate is obtained together with some unchanged parent material and can be eluted from the aluminium oxide column with mixtures of benzene and ether. The compound crystallises from ether in plates which melt at 176–178° C.

8.5 parts of this mono-acetate are dissolved in 100 parts of glacial acetic acid, 100 parts of 2 percent chromium trioxide in glacial acetic acid (2 parts CrO₃) added and the mixture allowed to stand for 16 hours at 20° C. It is then strongly concentrated down in vacuo at a bath temperature of 30° C., water added, and the whole extracted with ether. After having been washed with dilute sulphuric acid, sodium carbonate solution and water, and dried with sodium sulphate, the ether solution is evaporated down and crystallization, which soon starts, is made as complete as possible by the addition of some petroleum ether. In this way pregnane-3,11,20-trione-21-ol-acetate is obtained in colourless crystals which melt at 153–155° C.

By mixing 10 parts of bromine with 384 parts of glacial acetic acid, a normal bromine solution is prepared; 9.6 parts of the product of melting point 153–155° C. are dissolved in 50 parts of glacial acetic acid and two drops of the above bromine solution added. After a few minutes the colour suddenly disappears; 48 parts of the bromine solution are then slowly added, cooling and rotating continually, and are almost instantaneously decoloured. Crystallisation occurs after evaporating down in vacuo at a bath temperature of 25° C. The colourless crystals of the so formed 4-brom-pregnane-3,11,20-trione - 21 - ol -acetate melt, after washing with ether, at 180–185° C.

This bromide is then boiled for 5 hours under reflux with 100 parts of absolute pyridine. After evaporation down in vacuo, the residue is extracted with a large volume of ether, the ether solution washed with a little dilute hydrochloric acid, sodium carbonate solution and water, dried over sodium sulphate and evaporated down. The residue is purified chromatographically over a column of aluminium oxide, whereby the first portions eluted with benzene give crystals which have a low and indefinite melting point. The other fractions eluted with benzene and with a mixture of benzene and ether give, after recrystallisation twice from a mixture of acetone and ether, colourless needles which have a melting point of 175–178° C. and a specific rotation $$[\alpha]_D^{22} = +211° \pm 3°$$

(c=0.676 in acetone). The compound is Δ⁴-pregnene-3,11,20-trione-21-ol-acetate (dehydro-corticosterone acetate). A sample of very pure natural dehydro-corticosterone acetate melts under the same conditions at 177–179° C., gives no melting point depression with the synthetic product and has the same specific rotation. By saponification with a methyl alcoholic solution of hydrochloric acid or a solution of potassium bicarbonate in dilute methyl alcohol, the free dehydrocorticosterone is obtained, melting at 174–180° C. The latter compound can subsequently be converted in a known way into any ester, for example, the propionate, palmitate, benzoate, succinate, butyrates, phosphates or carbonates. The mentioned carbonic acid esters can also be obtained directly if, instead of lead tetra-acetate, the corresponding lead tetra-acylates or aryl-iodoso-acylates are used.

The same end-product is obtained starting from pregnane-3α-ol-11,20-dione which can be obtained, for example, from pregnane-3α,11-diol-20-one by acetylation, oxidation and subsequent saponification.

*Example 2*

25 parts of pregnane-3β,11α-diol-20-one, colourless granules melting at 255° C., [prepared for example, from 3β,11α-dihydroxy-bisnorcholanic acid methyl ester (which may be obtained as described in patent application Serial No. 474,726, filed February 4, 1943) by degradation of the side chain using Barbier-Loquin's method, if necessary purifying via the 3β-acetoxy-pregnane-11α-ol-20-one, which crystallizes from a mixture of ether and petroleum ether in colorless needles melting at 164° C. and having a specific rotation in acetone of $[\alpha]_D = +115°$] are well dried, dissolved in 1200 parts of very pure acetic acid containing 12 parts of water and heated for 24 hours to 60° C. with 60 parts of lead tetraacetate, with the exclusion of moisture. On working up as described in Example 1, a neutral crude product is obtained from which 10 parts of starting material are recovered by crystallisation from ether. The amorphous mother liquors containing pregnane-3β,11α,21-triol-20-one-21-mono-acetate is oxidized with aluminium phenolate and acetone. Chromatographic purification of the oxidation product so obtained gives pregnane-11α,21-diol-3,20-dione-21-mono-acetate, which forms from ether colourless needles, melting point 159° C. and $[\alpha]_D^{18} = +128°$ (acetone). By bromination and boiling with pyridine it can be converted into corticosterone acetate, melting point 157–159° C. Saponification of the latter with potassium bicarbonate in dilute methanol gives free cortisosterone.

If pregnane - 3β,11α,21 - triol-20-one-21-mono-acetate is oxidized with chromic acid instead of with aluminium phenolate and acetone, chromatographic separation of the oxidation product and recrystallisation from a mixture of ether and petroleum ether gives pregnane-3,11,20-trione-21-ol-acetate in colourless needles which melt at 153–155° C. Bromination and subsequent boiling with pyridine leads, as described in Example 1, to dehydrocorticosterone acetate, which melts at 176–178 ° C. and gives on saponification free corticosterone.

If instead of pregnane-3β,11α-diol-20-one there is used $\Delta^{11}$-21-dicarboxy-pregnene-3-ol-20-one (prepared, for example, from $\Delta^{11}$-3-acetoxy-etiocholenic acid by treatment with sodium malonic ester and alkaline hydrolysis) as starting material, 11-anhydro-corticosterone acetate is obtained in a similar way, with additional heating of the first product of the reaction for the purpose of decarboxylation.

What I claim is:

1. In a process for the manufacture of a compound of the adrenal cortical hormone series, the steps of treating a compound of the cyclopentano-polyhydro-phenanthrene series which contains in the 3-position a free nuclear hydroxyl group, in the 17-position an acetyl group, and as the nuclear grouping formed with the ring carbon atom in the 11-position the grouping

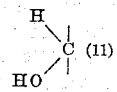

with an acylate selected from the group consisting of lead tetra-acylates and aryl-iodoso-acylates, and subsequently reacting the resultant product with a dehydrogenating agent whereby at least the free nuclear hydroxyl group in 3-position is converted into a keto group.

2. In a process for the manufacture of a compound of the adrenal cortical hormone series, the steps of treating a compound of the cyclopentano-polyhydro-phenanthrene series which contains in the 3-position a free nuclear hydroxyl group, in the 17-position an acetyl group, and as the nuclear grouping formed with the ring carbon atom in the 11-position the grouping

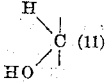

with an acylate selected from the group consisting of lead tetra-acylates and aryl-iodoso-acylates, and subsequently reacting the resultant product with a member selected from the group consisting of metal alcoholates and phenolates in presence of a carbonyl compound, whereby the free nuclear 3-hydroxyl group is converted into a keto group.

3. In a process for the manufacture of a compound of the adrenal cortical hormone series, the steps of treating a compound of the cyclopentano-polyhydrophenanthrene series which contains in the 3-position a free nuclear hydroxyl group, in the 17-position an acetyl group, and as the nuclear grouping formed with the ring carbon atom in the 11-position the grouping

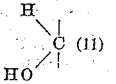

with an acylate selected group the group consisting of lead tetra-acylates and aryl-iodoso-acylates, and subsequently reacting the resultant product with an oxidizing agent whereby at least the free nuclear hydroxyl group in 3-position is converted into a keto group, and finally introducing a double bond into the α-position to the newly formed 3-keto group by halogenation and subsequent elimination of hydrohalide.

4. In a process for the manufacture of a compound of the adrenal cortical hormone series, the steps of treating a compound of the cyclopentano-polyhydrophenanthrene series which contains in the 3-position a free nuclear hydroxyl group, in the 17-position an acetyl group, and as the nuclear grouping formed with the ring carbon atom in the 11-position the grouping

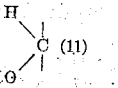

with an acylate selected from the group consisting of lead tetra-acylates and aryl-iodoso-acylates, and subsequently reacting the resulting product with an oxidizing agent whereby at least the free nuclear hydroxyl group in 3-position is converted into a keto group, then introducing a double bond into the α-position to the newly formed 3-keto group by halogenation and subsequent elimination of hydrohalide, and finally treating the product with a hydrolyzing agent.

5. In a process for the manufacture of a compound of the adrenal cortical hormone series, the steps of treating a compound of the cyclopentano-polyhydrophenanthrene series which contains in the 3-position a free nuclear hydroxyl group, in the 17-position an acetyl group, and as the nuclear grouping formed with the ring carbon atom in the 11-position the grouping

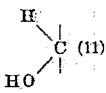

with lead tetra-acetate, and subsequently reacting the resultant product with an oxidizing agent whereby at least the free nuclear hydroxyl group in 3-position is converted into a keto group, then introducing a double bond into the α-position to the newly formed 3-keto group by halogenation and subsequent elimination of hydrohalide, and finally treating the product with a hydrolyzing agent.

6. In a process for the manufacture of a compound of the adrenal cortical hormone series, the steps of treating a compound of the cyclopentano-polyhydrophenanthrene series which contains in the 3-position a free nuclear hydroxyl group, in the 17-position an acetyl group, and as the nuclear grouping formed with the ring carbon atom in the 11-position the grouping

with an acylate selected from the group consisting of lead tetra-acylates and aryl-iodoso-acylates, and subsequently reacting the resultant product with an oxidizing agent whereby at least the free nuclear hydroxyl group in 3-position is converted into a keto group, and finally introducing a double bond into the α-position to the newly formed 3-keto group by halogenation and subsequent elimination of hydrohalide.

7. In a process for the manufacture of a compound of the adrenal cortical hormone series, the steps of treating a compound of the cyclopentano-polyhydrophenanthrene series which contains in the 3-position a free nuclear hydroxyl group, in the 17-position an acetyl group, and as the nuclear grouping formed with the ring carbon atom in the 11-position the grouping

with an acylate selected from the group consisting of lead tetra-acylates and aryl-iodoso-acylates, and subsequently reacting the resultant product with an oxidizing agent whereby at least the free nuclear hydroxyl group in 3-position is converted into a keto group, then introducing a double bond into the α-position to the newly formed 3-keto group by halogenation and subsequent elimination of hydrohalide, and finally treating the product with a hydrolyzing agent.

8. In a process for the manufacture of a compound of the adrenal cortical hormone series, the steps of treating a compound of the cyclopentano-polyhydrophenanthrene series which contains at least in the 3-position a free nuclear hydroxyl group, in the 17-position an acetyl group, and as the nuclear grouping formed with the ring carbon atom in the 11-position the grouping

with an acylate selected from the group consisting of lead tetra-acylates and aryl-iodoso-acylates, and subsequently reacting the resultant product with an oxidizing agent, then introducing a double bond into the α-position to the newly formed 3-keto group by halogenation and subsequent elimination of hydrohalide, and finally treating the product with a hydrolyzing agent to saponify the ester groups present and with an esterifying agent to introduce a different acid radical.

9. The process according to claim 8 wherein the acylate is lead tetra-acetate.

10. In a process for the manufacture of a compound of the adrenal cortical hormone series, the step of treating a compound of the cyclopentano-polyhydrophenanthrene series which contains at least in the 3-position a free nuclear hydroxyl group, in the 17-position an acetyl group, and as the nuclear grouping formed with the ring carbon atom in the 11-position a member of the group consisting of

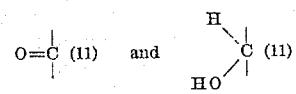

with lead tetra-acetate, and subsequently reacting the resultant product with aluminum phenolate and acetone, whereby the free nuclear 3-hydroxyl group is converted into a keto group.

11. In a process for the manufacture of a compound of the adrenal cortical hormone series, the step of treating a compound of the cyclopentano-polyhydrophenanthrene series which contains at least in the 3-position a free nuclear hydroxyl group, in the 17-position an acetyl group, and as the nuclear grouping formed with the ring carbon atom in the 11-position a member of the group consisting of

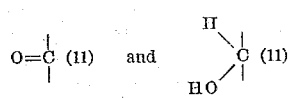

with lead tetra-acetate, and subsequently reacting the resultant product with aluminum phenolate and acetone, whereby the free nuclear 3-hydroxyl group is converted into a keto group, and finally introducing a double bond into the α-position to the newly formed 3-keto group by bromination and subsequent dehydrobromination.

12. In a process for the manufacture of a compound of the adrenal cortical hormone series, the step of treating a compound of the cyclopentano-polyhydrophenanthrene series which contains at least in the 3-position a free nuclear hydroxyl group, in the 17-position an acetyl group, and as the nuclear grouping formed with the ring carbon atom in the 11-position a member of the group consisting of

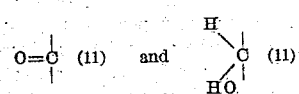

with an acylate selected from the group consisting of lead tetra-acylates and aryl-iodoso-acylates, and subsequently reacting the resultant product with an agent selected from the group consisting of oxidizing and dehydrogenating agents.

13. The saturated pregnane-20-ones containing as sole substitutent in ring C at the carbon atom 11 a free hydroxyl group, at the carbon atom 21 a group which upon hydrolysis is convertible into hydroxyl and at the position 3 a nuclear grouping containing only one oxygen atom obtainable by oxidation of a methylene group.

14. The saturated pregnane-20-ones containing as sole substituent in ring C at the carbon atom 11 a free hydroxyl group, at the carbon atom 21 an esterified hydroxyl group, and at the position 3 a nuclear grouping containing only one oxygen atom obtainable by oxidation of a methylene group.

15. The saturated pregnane-20-ones containing as sole substituent in ring C at the carbon atom 11 a free hydroxyl group, at the carbon atom 21 an esterified hydroxyl group, and at the carbon atom 3 is a hydroxyl group.

16. The saturated pregnane-20-ones containing as sole substituent in ring C at the carbon atom 11 a free hydroxyl group, at the carbon atom 21 an esterfied hydroxyl group, and at the carbon atom 3 an oxo group.

17. The pregnane - 11α,21 - diol-3,20-dione-21-mono-acetate melting at about 159° C.

TADEUS REICHSTEIN.

REFERENCES CITED

The following references are of record in the file of this patent:

UNITED STATES PATENTS

| Number | Name | Date |
|---|---|---|
| 2,330,772 | Bockmuhl | Feb. 4, 1941 |
| 2,230,773 | Bockmuhl | Feb. 4, 1941 |
| 2,239,742 | Serini | Apr. 29, 1941 |